United States Patent
Hsiao et al.

(10) Patent No.: US 11,239,759 B2
(45) Date of Patent: Feb. 1, 2022

(54) POWER CONVERSION DEVICE AND CONTROL METHOD FOR VOLTAGE EQUALIZATION

(71) Applicant: DELTA ELECTRONICS, INC., Taoyuan (TW)

(72) Inventors: Chi-Lung Hsiao, Taoyuan (TW); Hui-Chung Hsieh, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/846,404

(22) Filed: Apr. 13, 2020

(65) Prior Publication Data
US 2020/0336072 A1    Oct. 22, 2020

(30) Foreign Application Priority Data
Apr. 16, 2019   (CN) .......................... 201910304681.3

(51) Int. Cl.
*H02M 3/335*   (2006.01)
(52) U.S. Cl.
CPC .............................. *H02M 3/33592* (2013.01)
(58) Field of Classification Search
None
See application file for complete search history.

(56) References Cited

U.S. PATENT DOCUMENTS

| 5,946,206 A * | 8/1999 | Shimizu ................ H02M 3/285 363/65 |
| 8,773,874 B2 * | 7/2014 | Hasegawa ............. H02M 3/155 363/65 |
| 2018/0091059 A1 * | 3/2018 | Nene .................... H02M 3/3376 |
| 2018/0145607 A1 | 5/2018 | Jiao et al. |
| 2019/0052180 A1 * | 2/2019 | Meneses Herrera ....................... H02M 3/33561 |
| 2020/0112267 A1 * | 4/2020 | Sakurai ................... H02M 1/44 |

FOREIGN PATENT DOCUMENTS

| CN | 105577008 A | 5/2016 |
| CN | 106533191 A | 3/2017 |
| TW | 201131927 A | 9/2011 |

* cited by examiner

*Primary Examiner* — Jeffrey A Gblende
(74) *Attorney, Agent, or Firm* — CKC & Partners Co., LLC

(57) ABSTRACT

A control method includes the following operations: combining multiple output voltages into a total output voltage; generating a first switching frequency based on a first voltage difference, and generating at least one offset frequency based on at least one second voltage difference; generating at least one second switching frequency according to the at least one offset frequency and the first switching frequency; and generating a first set of switching signals according to the first switching frequency, and generating at least one second set of switching signals according to the at least one second switching frequency to respectively control a switching element of the resonant converter circuits.

17 Claims, 9 Drawing Sheets

POWER CONVERSION DEVICE AND CONTROL METHOD FOR VOLTAGE EQUALIZATION

CROSS-REFERENCE TO RELATED APPLICATION

This application claims priority to China Application Serial Number 201910304681.3, filed Apr. 16, 2019, which is herein incorporated by reference in its entirety.

BACKGROUND

Technical Field

The present disclosure relates to a power conversion device and a control method, and in particular to the power conversion device and the control method for voltage equalization.

Description of Related Art

Generally, when outputs of multiple resonant converter circuits are coupled in series, the output voltages can be independently controlled via each resonant converter circuit, or the same control signals are generated to each resonant converter circuit according to a total output voltage corresponding to the stacked output voltages. However, the above control methods have several disadvantages. Electrical component tolerance or load transient may cause voltage unbalance between the resonant converters. Therefore, damages on the components or a protection procedure may occur. In addition, independent control of each resonant converter circuit also causes a large difference in switching frequencies, resulting in the difficulty of designing the electromagnetic interference suppression circuit.

SUMMARY

An aspect of the present disclosure relates to a power conversion device. The power conversion device includes a plurality of resonant converter circuits, a controller, a frequency processing circuit and a signal modulation circuit. The plurality of resonant converter circuits are configured to generate a plurality of output voltages respectively, in which outputs of the plurality of resonant converter circuits are coupled in series, in order to combine the plurality of output voltages into a total output voltage, and each of the plurality of resonant converter circuits comprises a set of switching elements. The controller is configured to generate a first switching frequency based on a first voltage difference and to generate at least one offset frequency based on at least one second voltage difference, in which the first voltage difference is a difference between the total output voltage and a first reference voltage, and the at least one second voltage difference is generated according to at least one first output voltage of the output voltages. The frequency processing circuit is configured to generate at least one second switching frequency according to the at least one offset frequency and the first switching frequency. The signal modulation circuit is configured to generate a first set of switching signals according to the first switching frequency, and to generate at least one second set of switching signals according to the at least one second switching frequency, in order to respectively control the set of switching elements of the plurality of resonant converter circuits.

An aspect of the present disclosure relates to a control method that includes the following operations: combining a plurality of output voltages into a total output voltage; generating a first switching frequency based on a first voltage difference, and generating at least one offset frequency based on at least one second voltage difference, in which the first voltage difference is a difference between the total output voltage and a first reference voltage, and the at least one second voltage difference is generated according to at least one first output voltage of the output voltages; generating at least one second switching frequency according to the at least one offset frequency and the first switching frequency; and generating a first set of switching signals according to the first switching frequency, and generating at least one second set of switching signals according to the at least one second switching frequency, in order to control a set of switching elements of each of a plurality of resonant converter circuits.

As described above, the power conversion device and the control method provided by the embodiments of the present disclosure can avoid the occurrence of unequal output voltages of the resonant converter circuits.

DETAILED DESCRIPTION

Figure 1:
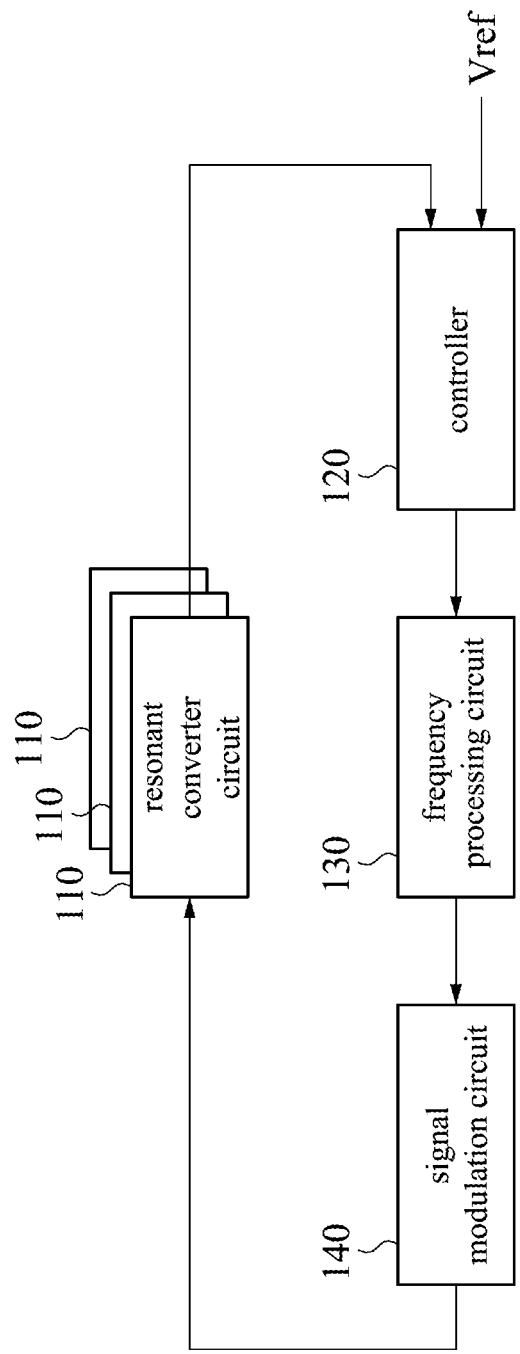
FIG. 1 shows a schematic diagram of a power conversion device according to some embodiments of the present disclosure.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terms used throughout the specification and claims are to be used in the ordinary meaning of the context and the specific content in the disclosure, unless otherwise specified. Certain terms used to describe this disclosure are discussed below or elsewhere in this specification, in order to provide additional guidance to those skilled in the art in the description of the present disclosure.

In the following, a plurality of embodiments of the present disclosure will be disclosed in the drawings, and for the sake of clarity, a number of practical details will be described in the following description. However, it should be understood that these practical details are not intended to limit the disclosure. Explained in another way, in some embodiments of this disclosure, these practical details are not necessary. In addition, some of the conventional structures and elements are shown in the drawings in a simplified schematic manner, in order to simplify the drawings.

Referring to FIG. 1, FIG. 1 is a schematic diagram of a power conversion device 100 according to some embodiments of the present disclosure. As shown in FIG. 1, in some embodiments, the power conversion device 100 includes a plurality of resonant converter circuits 110, a controller 120, a frequency processing circuit 130, and a signal modulation circuit 140.

Figure 2A:
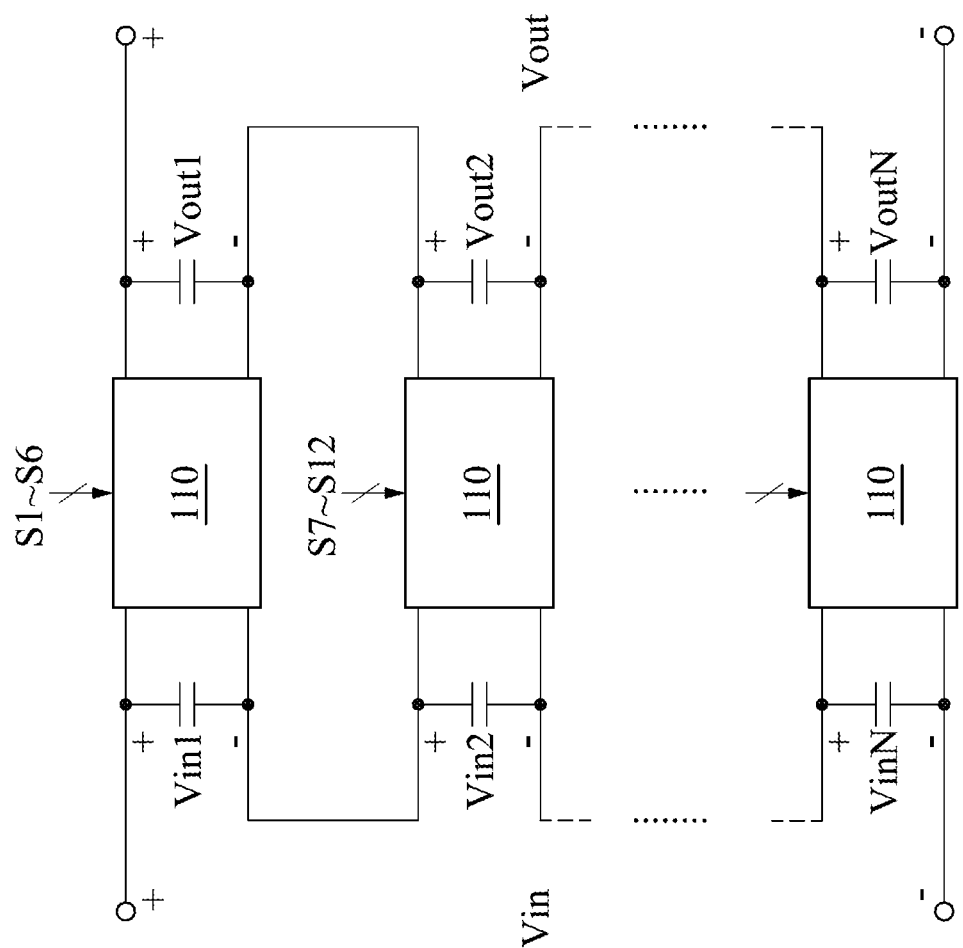
FIG. 2A shows a schematic diagram of a plurality of resonant converter circuits according to some embodiments of the present disclosure.

Structurally, control input ends of the plurality of resonant converter circuits 110 are electrically coupled to the signal modulation circuit 140, in order to receive switching signals (e.g. S1-S6 and S7-S12 in FIG. 2A). Output voltages of the plurality of resonant converter circuits 110 (e.g. Vout1, Vout2, and VoutN in FIG. 2A) are controlled according to the switching signals. Details regarding herein will be described in the following embodiments. Output ends of the plurality of resonant converter circuits 110 are electrically coupled to the controller 120. The controller 120 receives the output voltages generated by the plurality of resonant converter circuits 110 and a first reference voltage Vref. The frequency processing circuit 130 is coupled between the controller 120 and the signal modulation circuit 140 to generate a particular frequency. It is noted that the controller 120, the frequency processing circuit 130, and the signal modulation circuit 140 may be implemented with discrete analog circuits, or integrated as a processing unit. The processing unit can be implemented in different manners such as a microcontroller Unit (MCU), a complex programmable logic device (CPLD), or a field-programmable gate array (FPGA).

In some embodiments, the plurality of resonant converter circuits 110 may include a three-phase resonant converter circuit, a half bridge converter circuit, or a full bridge converter circuit.

Referring to FIG. 2A, FIG. 2A is a schematic diagram of a plurality of resonant converter circuits 110 according to some embodiments of the present disclosure. For ease of understanding, like elements in FIG. 1 and FIG. 2A will be designated with the same reference number.

As shown in FIG. 2A, the input voltage Vin is supplied to the plurality of resonant converter circuits 110, in order to generate a total output voltage Vout. An input capacitor is arranged at an input of each resonant converter circuit 110, in which voltages on the input capacitors are input voltage Vin1 to input voltage VinN in sequence. In some embodiments, N is a preset value that is a positive integer greater than or equal to 2 and is the number of the plurality of resonant converter circuits 110.

In some embodiments, the resonant converter circuit 110 receives a first set of switching signals S1-S6, in order to adjust the output voltage Vout1. The resonant converter circuit 110 receives a second set of switching signals S7-S12, in order to adjust the output voltage Vout2. With this analogy, the last resonant converter circuit 110 can generate an output voltage VoutN according to a corresponding set of switching signals (not shown) and the input voltage VinN. As shown in FIG. 2A, the outputs of the plurality of resonant converter circuits 110 are coupled in series. As such, the total output voltage Vout is formed with a combination of the plurality of output voltages Vout1-VoutN.

Figure 2B:
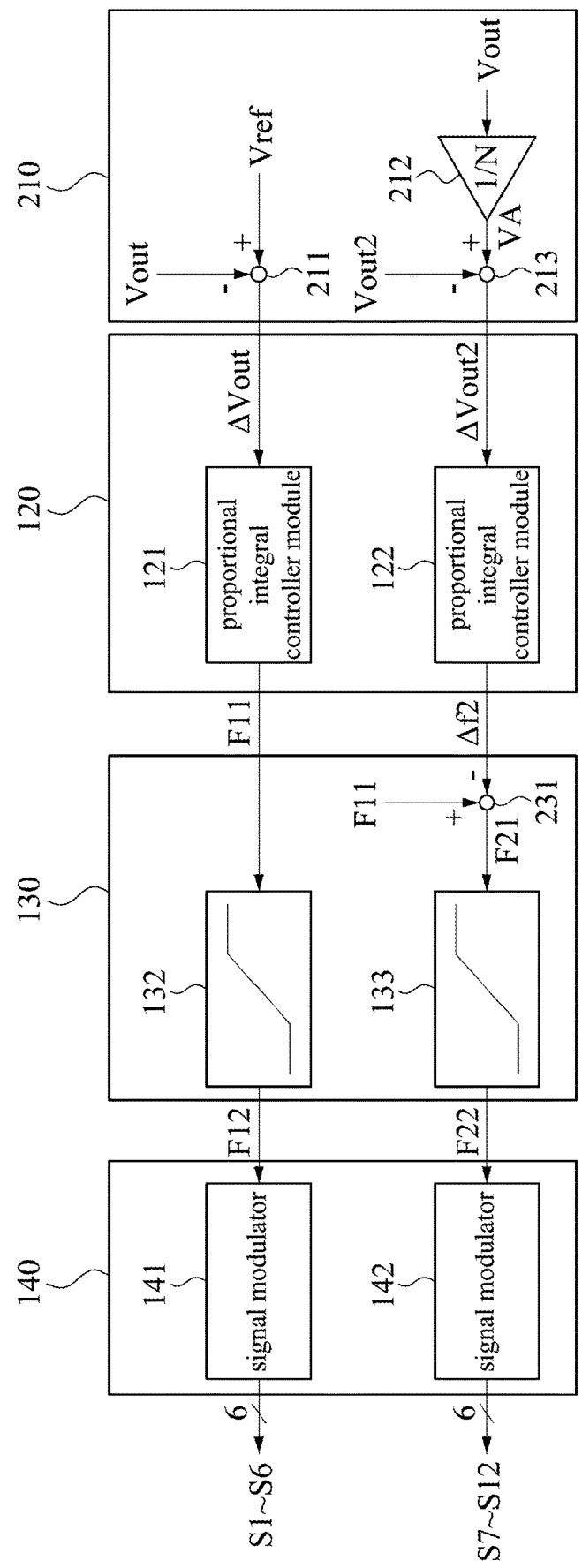
FIG. 2B shows a partial circuit diagram of the power conversion device according to some embodiments of the present disclosure.

Referring to FIG. 2B, FIG. 2B is a partial circuit diagram of the power conversion device 100 according to some embodiments of the present disclosure. For ease of understanding, like elements in FIG. 1 and FIG. 2B are designated with the same reference number.

For ease of explanation, the following example where two resonant conversion circuits 110 are employed is given, that is, the preset value N is set to be 2. In this example, the power conversion device 100 further includes a voltage generation circuit 210. The voltage generation circuit 210 is configured to generate at least one voltage signal to the controller 120 based on the total output voltage Vout and the first reference voltage Vref.

For example, the voltage generation circuit 210 includes an arithmetic circuit 211, at least one average circuit 212, and at least one arithmetic circuit 213. The arithmetic circuit 211 is configured to subtract the total output voltage Vout from the first reference voltage Vref, in order to generate a voltage difference $\Delta$Vout. The at least one average circuit 212 is configured to generate an average voltage VA according to the total output voltage Vout and the preset value N. At least one operation circuit 213 is configured to subtract the output voltage Vout2 from the average voltage VA, in order to generate a voltage difference $\Delta$Vout2.

In some embodiments, the first reference voltage Vref is an external input signal for aiding the adjustment of the total output voltage Vout. In this example, the first reference voltage Vref may be a target voltage at which the total output voltage Vout is expected.

In some embodiments, the controller 120 receives the voltage difference Vout and the voltage difference $\Delta$Vout2, and determines a switching frequency F11 and an offset frequency $\Delta$f2, respectively.

In some embodiments, the controller 120 includes a plurality of proportional-integral and derivative (PID) controller modules. It is understood that the PID controller module is a feedback loop circuit or algorithm employed in industrial control applications, and the relevant parameters of the PID controller module can be set according to actual requirements in order to be set as a proportional controller module, an integral controller module, a differential controller module or any combination thereof. The controller 120 can also be implemented by using various control methods well known to those skilled in the art, such as fuzzy control. In this example, the controller 120 includes a proportional integral (PI) controller module 121 and a PI controller module 122.

In some embodiments, the PI controller module 121 is configured to generate the switching frequency F11 based on the voltage difference $\Delta$Vout. In some embodiments, the PI controller module 122 is configured to generate the offset frequency $\Delta$f2 based on the voltage difference $\Delta$Vout2. Since the resonant converter circuit 110 operates under the control of the controller 120, the corresponding switching frequency is generated according to the difference between the output voltage and the target voltage, in order to adjust the output of the resonant converter circuit 110. Taking the resonant converter circuit 110 being an LLC series resonant circuit as an example, the output voltage can be increased by lowering the switching frequency to increase the gain of the converter. Thus, in this embodiment, the voltage difference $\Delta$Vout is not limited to be generated by subtracting the total output voltage Vout from the first reference voltage Vref. The voltage difference $\Delta$Vout may be generated by subtracting the first reference voltage Vref from the total output voltage Vout as well. As long as the PI controller module 121 is properly designed, the corresponding adjustment direction is generated according to the voltage difference $\Delta$Vout, so that the output voltage is close to the first reference voltage Vref. Details regarding herein are understood by the person in the art according to the basic feedback control theory, and thus the details are not further given.

In some embodiments, the frequency processing circuit 130 generates a switching frequency F21 based on the switching frequency F11 and the offset frequency $\Delta$f2. For example, the frequency processing circuit 130 includes at least one operation circuit 231, which is configured to subtract the offset frequency $\Delta$f2 from the switching frequency F11, in order to generate the switching frequency F21.

In some embodiments, the frequency processing circuit 130 further includes a limiter 132 and a limiter 133. The limiter 132 and the limiter 133 are configured to respectively limit a maximum value and a minimum value of the switching frequency F11 and those of the switching frequency F21, in order to output the switching frequency F12 and the switching frequency F22.

In some embodiments, the operation of the limiter 132 and the limiter 133 is only used to ensure that all switching frequencies are within a preset frequency range. In some embodiments, the limiter 132 and the limiter 133 may be implemented with software that determines the upper and lower limits of the value of the switching frequency, but the present disclosure is not limited thereto.

In some embodiments, the signal modulation circuit 140 receives the switching frequency F12 and the switching frequency F22. The signal modulation circuit 140 includes a plurality of signal modulators 141 and 142. The signal modulator 141 generates a first set of switching signals S1-S6 according to the switching frequency F12. The signal modulator 142 generates a second set of switching signals S7-S12 according to the switching frequency F21. The first set of switching signals S1-S6 and the second set of switching signals S7~S12 are respectively for controlling internal switching elements of the two resonant converter circuits 110 (such as the switching element 310 described later). These two resonant converter circuit 110 respectively generate output voltages Vout1 and Vout2. The specific number of each set of switching signals may be different according to the type of the resonant converter circuit 110, and thus each set of switching signals may include one or more switching signals that are generated according to the switching frequency, as described in detail later.

In some embodiments, each of the signal modulators 141 and 142 may be implemented by a pulse width modulation circuit, but the present disclosure is not limited thereto.

In some related approaches, the plurality of output series resonant converter circuits are independently controlled, in order to individually adjust the output voltage generated by each stage of the resonant converter circuit. This control method may cause the output voltage of each resonant converter circuit 110 to be unequal. Compared with the above approaches, in the embodiments of the present disclosure, the converter circuits are switched via the switching frequency F11 and the offset frequency $\Delta$f2. Not only the total output voltage Vout is able to be generated according to the demand, but also the output voltage Vout1 and the output voltage Vout2 are balanced. Even if there is load transient condition or tolerance variation between the respective converter circuit elements, the output voltage of each converter circuit can be balanced while maintaining the total output voltage. It is noted that, in the embodiments of the present disclosure, as the switching frequency F21 is generated from the switching frequency F11 and the offset frequency $\Delta$f2, and the offset frequency $\Delta$f2 is generated according to the voltage difference $\Delta$Vout2, the switching frequency F11 is kept being substantially equal to the switching frequency F21. Compared to traditional independent control, a design on electromagnetic interference suppression circuit(s) is easier.

Figure 2C:
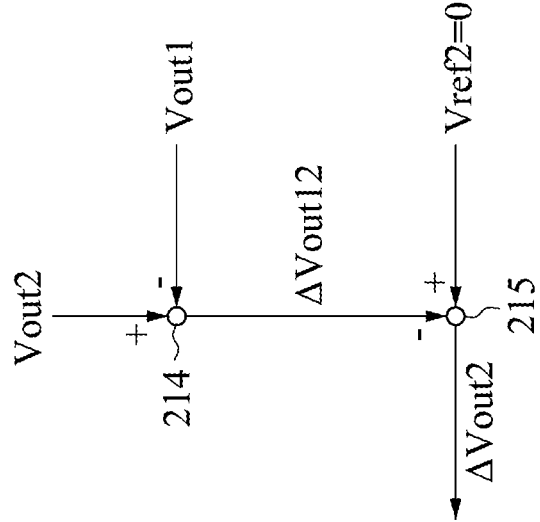
FIG. 2C shows a schematic diagram of a voltage generation circuit according to some embodiments of the present disclosure.

Referring to FIG. 2C, FIG. 2C is a schematic diagram of a voltage generation circuit 210 according to some embodiments of the present disclosure. For ease of understanding, like elements in FIG. 2B and FIG. 2C are designated with the same reference number. Compared with FIG. 2B, in this example, the voltage generation circuit 210 generates the aforementioned voltage difference ΔVout2 according to a second reference voltage Vref2. The second reference voltage Vref2 may be fixed to zero, in order to set the second reference voltage Vref2 in more instinctive and efficient way.

In this example, the voltage generation circuit 210 further includes an operation circuit 214 and an operation circuit 215. The operation circuit 214 is configured to subtract the output voltage Vout1 from the output voltage Vout2, in order to generate a comparison voltage difference ΔVout12. The operation circuit 215 subtracts the comparison voltage difference ΔVout12 from the second reference voltage Vref2, in order to generate the voltage difference ΔVout2.

Figure 2D:
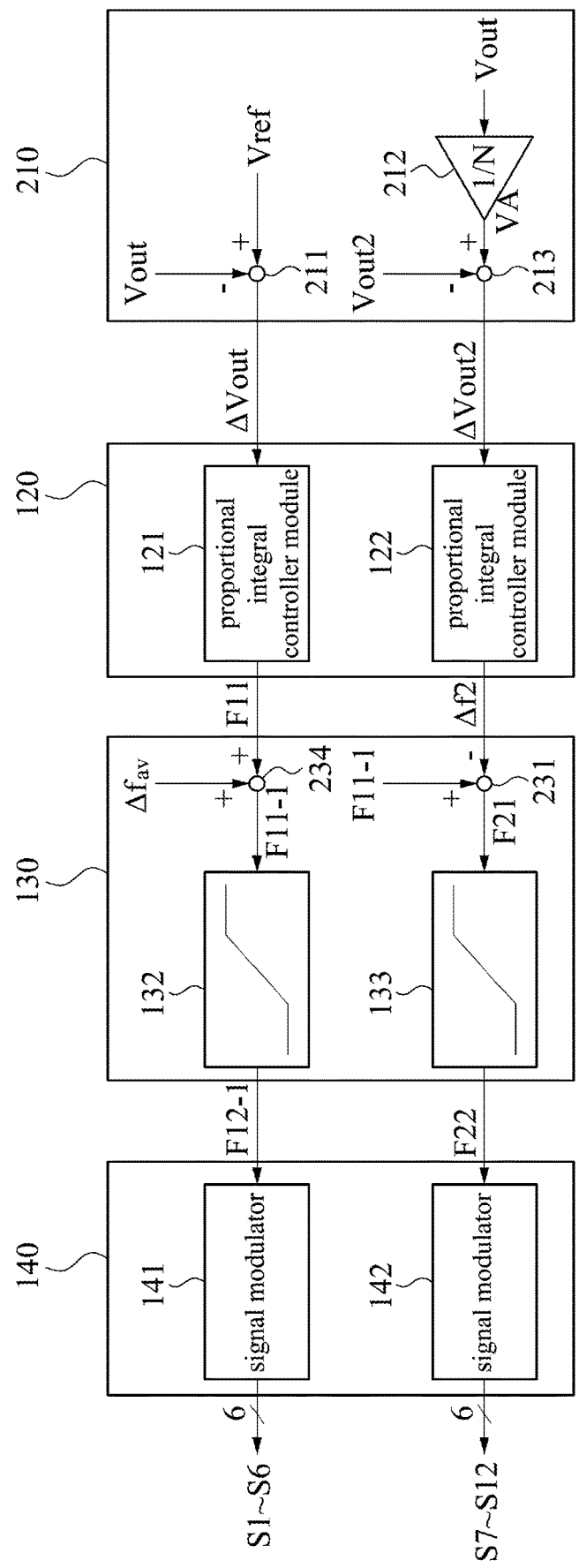
FIG. 2D shows a partial circuit diagram of a power conversion device according to some embodiments of the present disclosure.

Referring to FIG. 2D, FIG. 2D is a partial circuit diagram of a power conversion device 100 according to some embodiments of the present disclosure. For ease of understanding, like elements in FIGS. 2B to 2D are designated with the same reference number.

Compared to FIG. 2B, in some embodiments, the frequency processing circuit 130 is further configured to adjust the switching frequency F11 according to the offset frequency Δf2. In some embodiments, the frequency processing circuit 130 further calculates an offset frequency average Δfav according to the offset frequency Δf2. The offset frequency average Δfav can be derived from the following equation:

$$\Delta fav = \frac{\sum_{k=2}^{N} \Delta fk}{N-1}$$

In some embodiments, the controller 120 correspondingly generates a plurality of offset frequencies for calculating the offset frequency average value Δfav according to the number of the plurality of resonant converter circuits 110. For example, the preset value N is set to be 2, and thus the offset frequency average Δfav is Δf2.

The frequency processing circuit 130 further adds the offset frequency average Δfav to the switching frequency F11, in order to generate the switching frequency F11-1. The limiter 132 generates the switching frequency F12-1 according to the switching frequency F11-1, in order to provide the switching frequency F12-1 to the signal modulation circuit 140.

In this example, the frequency processing circuit 130 further includes an operation circuit 234. The operation circuit 234 is configured to add the offset frequency average Δfav and the switching frequency F11, in order to adjust the switching frequency F11 to the switching frequency F11-1. Compared to FIG. 2B, the operation circuit 231 subtracts the offset frequency Δf2 from the switching frequency F11-1, in order to generate the switching frequency F21.

In some embodiments, the switching frequency F11-1 is obtained by summing up the switching frequency F11 and the offset frequency average Δfav. The switching frequency F21 is generated by subtracting the offset frequency Δf2 from the switching frequency F11-1. As a result, the adjustment between the output voltage and the switching frequency of each resonant converter circuit 110 can be more efficiently accomplished. In this way, the adjustment time required for overall voltage control can be reduced.

The foregoing embodiments are given with reference to examples where N is set to 2, the number of circuits in the above embodiments is given for illustrative purposes, and the present disclosure is not limited thereto. For example, if N is set to 3, as shown in FIG. 2A, a resonant converter circuit 110 that generates the output voltage Vout3 (i.e., VoutN) is to be controlled. Under this condition, an additional set of circuits and/or modules may be added to the above embodiments. The arrangement of this set of circuits and/or modules is the same as that of the circuits and/or modules configured to generate the switching signals S7-S12. The operation circuit 213 (or the operation circuit 214) in this set of circuits and/or modules receives the output voltage Vout3 instead of the output voltage Vout2. By the same operation as described above, another set of switching signals can be generated, in order to control the resonant converter circuit 110 for generating the output voltage Vout3. With this analogy, the circuit arrangement of the embodiments of the present disclosure can be applied to N stages of the resonant converter circuit 110.

Figure 3A:
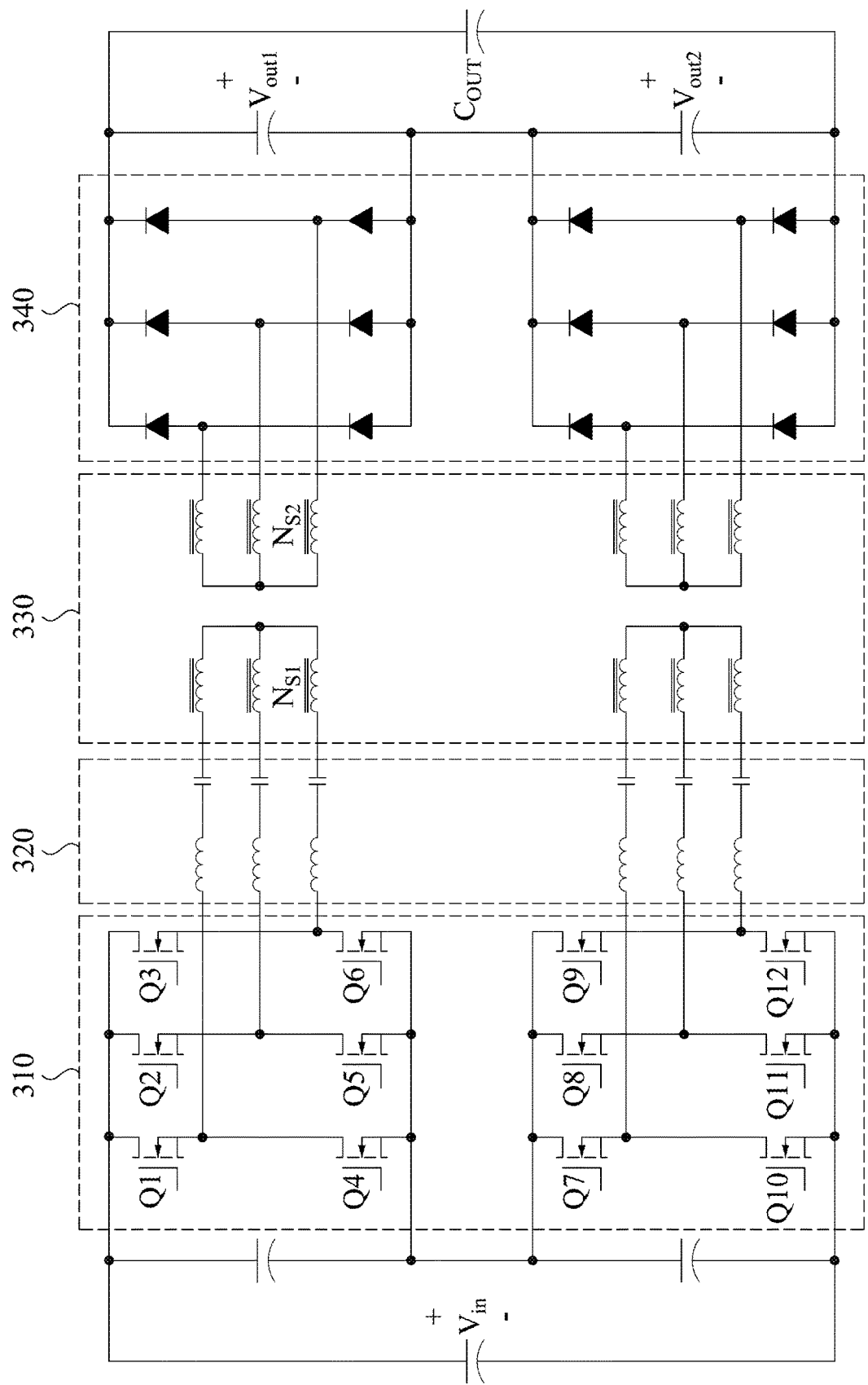
FIG. 3A shows a schematic diagram of a plurality of three-phase resonant converter circuits according to some embodiments of the present disclosure.

Referring to FIG. 3A, FIG. 3A is a schematic diagram of a plurality of three-phase resonant converter circuits according to some embodiments of the present disclosure. The plurality of three-phase resonant converter circuits in FIG. 3A can be used to implement the two resonant converter circuits 110 in FIG. 2A. For ease of understanding, like elements in FIG. 2A and FIG. 3A are designated with the same reference number.

In this example, the plurality of three-phase resonant converter circuits includes two three-phase resonant converter circuits. The three-phase resonant converter circuit includes a switching element 310, a resonant circuit 320, a transformer 330, and a rectifier circuit 340. The switching element 310 is electrically connected to the resonant circuit 320 and includes two sets of switches. The first set of switches (switches Q1-Q6) is selectively turned on according to the first set of switching signals S1-S6. The second set of switches (switches Q7-Q12) is selectively turned on according to the second set of switching signals S7-S12. The transformer 330 includes a first winding Ns1 and a secondary winding Ns2, and the first winding Ns1 is electrically connected to the resonant circuit 320. The rectifier circuit 340 is electrically connected to the secondary winding Ns2 of the transformer 330, in order to generate the total output voltage (i.e., the voltage of the output voltage Vout1 plus the output voltage Vout2).

In greater detail, the plurality of switches Q1-Q6 and a first portion of the resonant circuit 320, the transformer 330, and the rectifier circuit 340 form the resonant converter circuit 110 for generating the output voltage Vout1 in FIG. 2A. The switches Q1-Q6 can be controlled by the switching signals S1-S6, respectively. Similarly, the plurality of switches Q7-Q12 and a second portion of the resonant circuit 320, the transformer 330, and the rectifier circuit 340 form the resonant converter circuit 110 for generating the output voltage Vout2 in FIG. 2A. The switches Q7-Q12 can be controlled by the switching signals S7-S12, respectively. In this example, each resonant converter circuit 110 is the three-phase resonant converter circuit. The three-phase resonant converter circuit has three bridge arms formed with six switches. The switches Q1-Q6 are controlled by six switching signals. The six switching signals S1-S6 are generated according to the switching frequency, and the interleaving control is performed between the bridge arms.

In some embodiments, the rectifier circuit 340 is electrically connected to the secondary winding Ns2 of the transformer 330. The rectifier circuit 340 is configured to rectify a current which is outputted by the secondary winding Ns2, in order to provide the total output voltage Vout (i.e., the voltage of the output voltage Vout1 plus the output voltage Vout2).

Figure 3B:
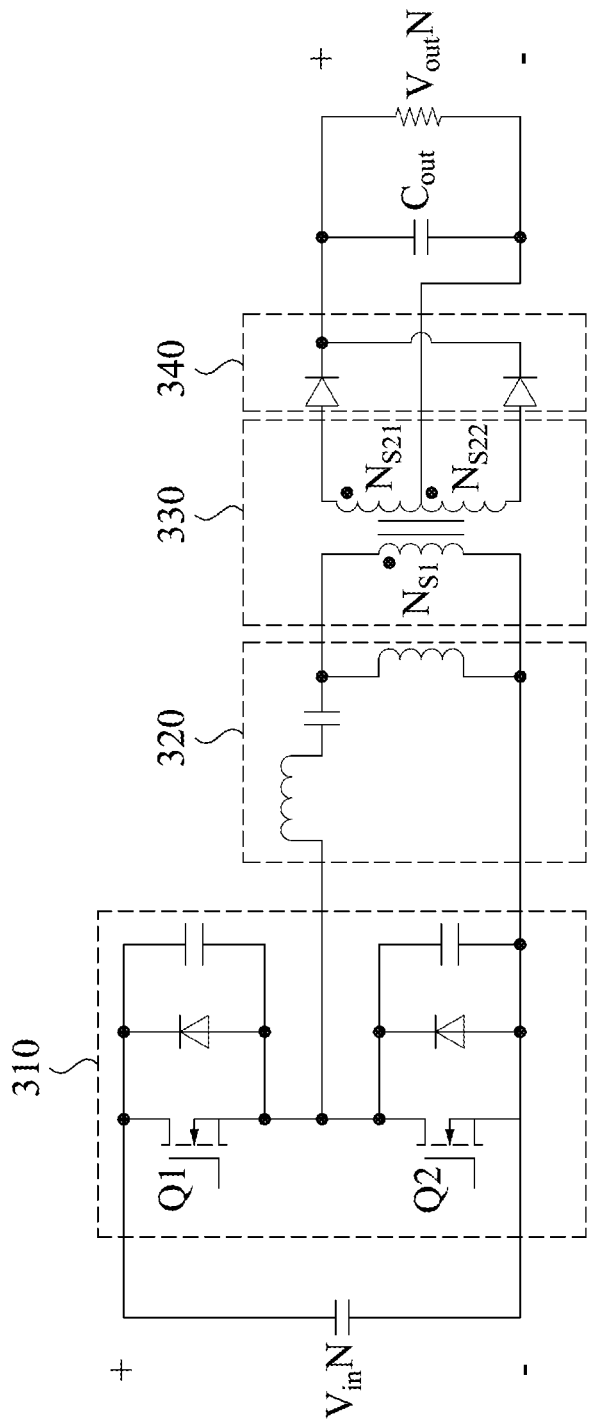
FIG. 3B shows a schematic diagram of a half bridge resonant converter circuit according to some embodiments of the present disclosure.

Referring to FIG. 3B, FIG. 3B is a schematic diagram of a half bridge resonant converter circuit according to some embodiments of the present disclosure. The half bridge resonant converter circuit of FIG. 3B can be used to implement the resonant converter circuit 110 of FIG. 2A. For ease of understanding, the Nth stage resonant converter circuit 110 is taken as an example, and like elements in FIG. 2A and FIG. 3B are designated with the same reference number.

As shown in FIG. 3B, the half bridge resonant converter circuit includes the switching element 310, the resonant circuit 320, the transformer 330, and the rectifier circuit 340. The switching element 310 includes the switch Q1 and the switch Q2. This figure is given only for illustrative purposes, and the disclosure is not limited thereto. In this example, each of the resonant converter circuits 110 is a half bridge resonant converter circuit having two switches forming a single bridge arm. The switch Q1-Q2 are controlled by two switching signals.

In some embodiments, the first side of transformer 330 includes a set of first windings Ns1. The secondary side of the transformer 330 includes two sets of secondary windings Ns21 and Ns22, in which the starting end of the secondary winding Ns22 is electrically coupled to the end of the secondary winding Ns21, and both are electrically coupled to the output capacitor Cout.

In some embodiments, the transformer 330 can also be a transformer with only one set of secondary windings on the secondary side, and is matched with a bridge rectifier circuit. The secondary side and its rectifier circuit can be completed in any form well known to those skilled in the art.

Figure 3C:
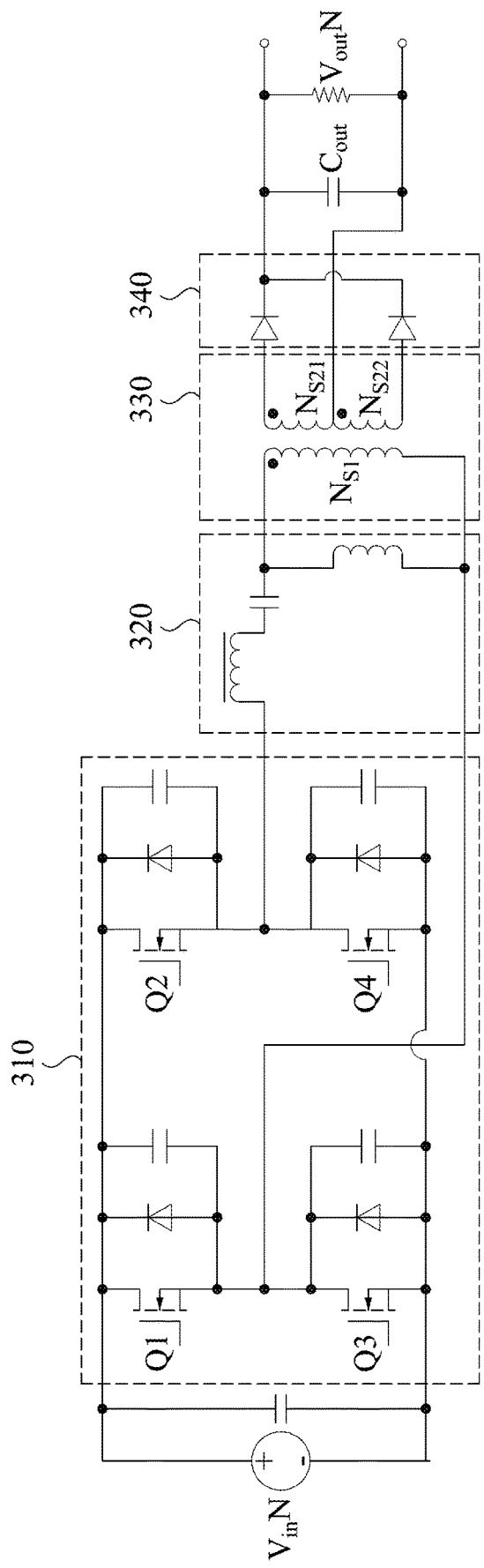
FIG. 3C shows a schematic diagram of a full bridge resonant converter circuit according to some embodiments of the present disclosure.

Referring to FIG. 3C, FIG. 3C is a schematic diagram of a full bridge resonant converter circuit according to some embodiments of the present disclosure. The full bridge resonant converter circuit of FIG. 3C can be used to implement the resonant converter circuit 110 of FIG. 2A. For ease of understanding, the Nth stage resonant converter circuit 110 is taken as an example, and like elements in FIG. 2A and FIG. 3C are designated with the same reference number.

As shown in FIG. 3C, the full bridge resonant converter circuit includes the switching element 310, the resonant circuit 320, the transformer 330, and the rectifier circuit 340. The switching element 310 includes the switch Q1, the switch Q2, the switch Q3, and the switch Q4. The figure is given only for illustrative purposes, and the disclosure is not limited thereto.

In some embodiments, the transformer 330 can also be a transformer with only one set of secondary windings on the secondary side, and is matched with a bridge rectifier circuit. The secondary side and its rectifier circuit can be completed in any form well known to those skilled in the art.

Figure 4:
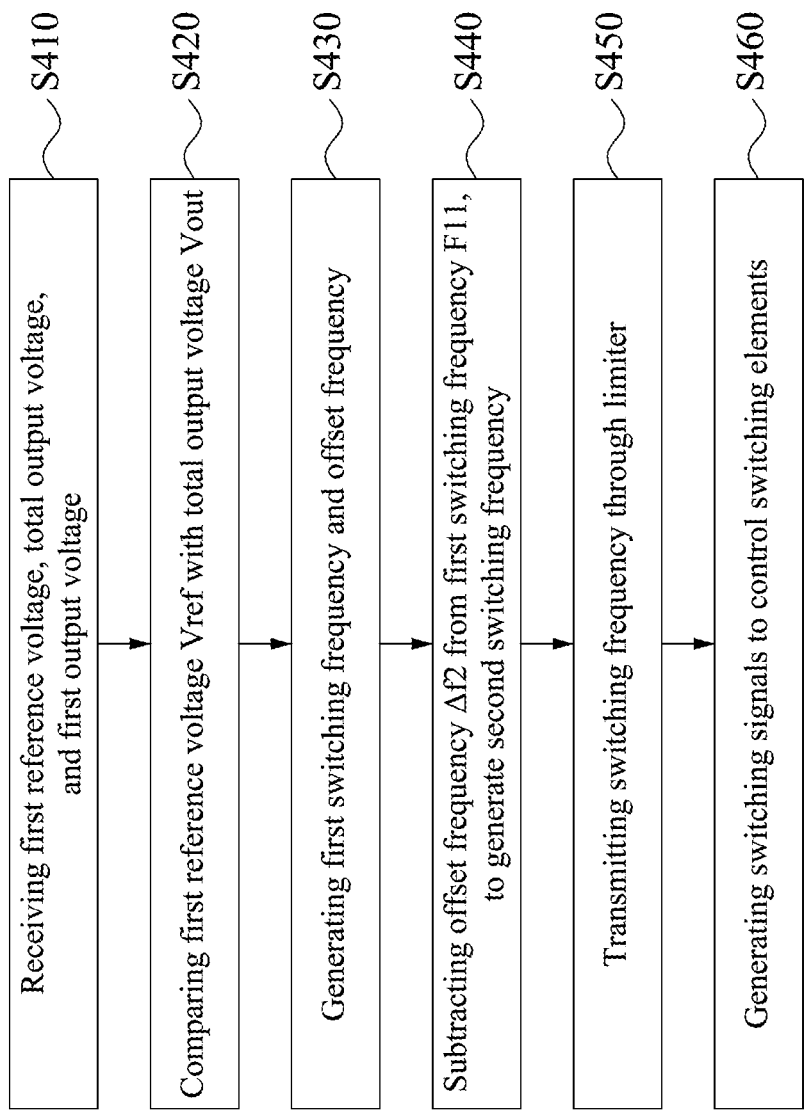
FIG. 4 shows a flow chart of a control method according to some embodiments of the present disclosure.

FIG. 4 shows a flow chart of a control method according to some embodiments of the present disclosure. For ease of understanding, reference is also made to the above FIGS. 1-3C. In some embodiments, the control method in FIG. 4 can be used for equally controlling the output voltages of the plurality of resonant converter circuits 110.

In operation S410, the voltage generation circuit 210 receives the first reference voltage Vref, the total output voltage Vout, and the first output voltage Vout2.

In operation S420, the first reference voltage Vref is compared with the total output voltage Vout, in order to generate a first voltage difference ΔVout. The total output voltage Vout is divided by a preset value to generate an average voltage. The average voltage is compared with the first output voltage Vout2, in order to generate a second voltage difference ΔVout2.

In some embodiments, the total output voltage Vout and the preset value are averaged via an averaging circuit to generate the average voltage, in which the preset value is the number of resonant converter circuit 100 included in the plurality of resonant converter circuits 110.

In operation S430, the controller 120 receives the first voltage difference Vout to generate the first switching frequency F11, and receives the second voltage difference ΔVout2 to generate the offset frequency Δf2.

In operation S440, the frequency processing circuit 130 receives the first switching frequency F11 and the offset frequency Δf2. The frequency processing circuit 130 subtracts the offset frequency Δf2 from the first switching frequency F11 via an arithmetic circuit, in order to generate the second switching frequency F21.

In operation S450, the frequency processing circuit 130 transmits the first switching frequency F11 and the second switching frequency F21 through the limiter 132 and the limiter 133, respectively. The limiter 132 and the limiter 133 respectively generate the first switching frequency F12 and the second switching frequency F22, to ensure that all switching frequencies are within the preset frequency range.

In operation S460, the signal modulation circuit 140 receives the first switching frequency F12 and the second switching frequency F22. The signal modulation circuit 140 generates the first set of switching signals S1-S6 according to the first switching frequency F12, and generates the second set of switching signals S7-S12 according to the second switching frequency F21, in order to control the switching element 310.

Through the above control method, the total output voltage Vout, the second output voltage Vout1 and the first output voltage Vout2 of the plurality of resonant converter circuits 110 can be controlled. The control method ensures that the total output voltage Vout meets the requirements and achieves the purpose of equalizing the output voltage of each stage.

The multiple operations in the control method of FIG. 4 are only examples. It is not limited to be performed in the order in this example. Various operations of the control method may be appropriately added, replaced, omitted, or performed in a different order, without departing from the operation and scope of the embodiments of the present disclosure.

As described above, the power conversion device and the control method provided by the embodiments of the present disclosure can avoid the occurrence of unequal output voltages of the resonant converter circuits.

Although the present disclosure has been disclosed in the above embodiments, but it is not limited thereto. Anyone who is familiar with this skill can make various changes and refinements without departing from the spirit and scope of this disclosure. Therefore, the scope of protection of this disclosure is subject to the definition of the scope of the patent application attached.

What is claimed is:

1. A power conversion device, comprising:
a plurality of resonant converter circuits, including a first converter circuit to a $n^{th}$ converter circuit, configured to generate a first output voltage to a $n^{th}$ output voltages respectively, wherein outputs of the plurality of resonant converter circuits are coupled in series, in order to combine the first output voltage to the $n^{th}$ output voltage into a total output voltage, and each of the plurality of resonant converter circuits comprises a set of switching elements, wherein n is an integer and n≥2;
a controller configured to generate a first switching frequency based on a first voltage difference and to generate at least one offset frequency based on at least one second voltage difference,
wherein the first voltage difference is a difference between the total output voltage and a first reference voltage, and the at least one second voltage difference is generated according to a $m^{th}$ output voltage, wherein n≥m≥2;
a frequency processing circuit configured to generate at least one second switching frequency, wherein the at least one second switching frequency is generated by subtracting the at least one offset frequency from the first switching frequency; and
a signal modulation circuit configured to generate a first set of switching signals according to the first switching frequency, and to generate at least one second set of switching signals according to the at least one second switching frequency, in order to respectively control the set of switching elements of the first converter circuit and a $m^{th}$ converter circuit.

2. The power conversion device of claim 1, wherein the plurality of resonant converter circuits comprises a three-phase resonant converter circuit, a half bridge resonant converter circuit, or a full bridge resonant converter circuit.

3. The power conversion device of claim 1, wherein the controller comprises:
a first proportional integral controller module configured to generate the first switching frequency based on the first voltage difference; and
at least one second proportional integral controller module configured to generate the at least one offset frequency based on the at least one second voltage difference.

4. The power conversion device of claim 1, wherein the frequency processing circuit comprises:
at least one arithmetic circuit configured to subtract the at least one offset frequency from the first switching frequency to generate the at least one second switching frequency.

5. The power conversion device of claim 1, wherein the frequency processing circuit comprises a plurality of limiters that are configured to respectively limit the first switching frequency and the at least one second switching frequency to be within a preset frequency range.

6. The power conversion device of claim 1, wherein the frequency processing circuit is further configured to adjust the first switching frequency according to the at least one offset frequency.

7. The power conversion device of claim 6, wherein the frequency processing circuit comprises:
a first arithmetic circuit configured to add an average value of the at least one offset frequency to the first switching frequency, in order to adjust the first switching frequency to a third switching frequency; and
at least one second arithmetic circuit configured to generate the at least one second switching frequency according to the at least one offset frequency and the third switching frequency.

8. The power conversion device of claim 1, further comprising:
a first arithmetic circuit configured to subtract the total output voltage from the first reference voltage, in order to generate the first voltage difference;
an average circuit configured to generate an average voltage according to the total output voltage and a preset value, wherein the preset value is a number of the plurality of resonant converter circuits; and
at least one second arithmetic circuit configured to subtract the $m^{th}$ output voltage from the average voltage, in order to generate the at least one second voltage difference.

9. The power conversion device of claim 1, further comprising:
at least one first arithmetic circuit configured to subtract the first output voltage from the $m^{th}$ output voltage, in order to generate at least one comparison voltage difference; and
at least one second arithmetic circuit configured to subtract the at least one comparison voltage difference from a second reference voltage, in order to generate the at least one second voltage difference.

10. The power conversion device of claim 9, wherein the plurality of resonant converter circuits comprises a first resonant converter circuit and at least one second resonant converter circuit, the first set of switching signals is configured to control the set of switching elements of the first resonant converter circuit, in order to adjust the first output voltage, and the at least one second set of switching signals is configured to control the set of switching elements of the at least one second resonant converter circuit, in order to adjust the $m^{th}$ output voltage.

11. A control method, comprising:
combining a plurality of output voltages, including a first output voltage to a $n^{th}$ output voltage, from outputs of a plurality of resonant converter circuits, including a first converter circuit to a $n^{th}$ converter circuit, into a total output voltage, wherein the outputs of a plurality of resonant converter circuits are connected in series, wherein n is an integer and n≥2;
generating a first switching frequency based on a first voltage difference, and generating at least one offset frequency based on at least one second voltage difference,
wherein the first voltage difference is a difference between the total output voltage and a first reference voltage, and the at least one second voltage difference is generated according to a $m^{th}$ output voltage, wherein n≥m≥2;
generating at least one second switching frequency according to the at least one offset frequency and the first switching frequency, wherein the at least one second switching frequency is generated by subtracting the at least one offset frequency from the first switching frequency; and
generating a first set of switching signals according to the first switching frequency, and generating at least one second set of switching signals according to the at least one second switching frequency, in order to control a set of switching elements of the first converter circuit and a $m^{th}$ converter circuit.

12. The control method of claim 11, further comprising:
limiting the first switching frequency and the at least one second switching frequency to be within a preset frequency range.

13. The control method of claim 11, further comprising:
adjusting the first switching frequency according to the at least one offset frequency.

14. The control method of claim 13, wherein the adjusting the first switching frequency further comprises:
adding an average value of the at least one offset frequency to the first switching frequency, in order to adjust the first switching frequency to a third switching frequency; and
generating the at least one second switching frequency according to the at least one offset frequency and the third switching frequency.

15. The control method of claim 11, further comprising:
subtracting the total output voltage from the first reference voltage, in order to generate the first voltage difference;
generating an average voltage according to the total output voltage and a preset value, wherein the preset value is a number of the plurality of resonant converter circuits; and
subtracting the $m^{th}$ output voltage from the average voltage, in order to generate the at least one second voltage difference.

16. The control method of claim 11, further comprising:
subtracting the first output voltage from the $m^{th}$ output voltage, in order to generate at least one comparison voltage difference; and
subtracting the at least one comparison voltage difference from a second reference voltage, in order to generate the at least one second voltage difference.

17. The control method of claim 16, further comprising:
controlling the set of switching elements of the plurality of resonant converter circuits by the first set of switching signals and the at least one second set of switching signals, in order to adjust the plurality of output voltages.

* * * * *